US008770080B2

(12) United States Patent
Kwon et al.

(10) Patent No.: US 8,770,080 B2
(45) Date of Patent: Jul. 8, 2014

(54) CUTTING WHEEL FOR GLASS SUBSTRATE

(75) Inventors: Oh-June Kwon, Yongin (KR);
Seung-Yong Song, Yongin (KR);
Young-Seo Choi, Yongin (KR);
Jin-Hwan Jeon, Yongin (KR);
Sun-Young Jung, Yongin (KR); Ji-Hun Ryu, Yongin (KR); Charles Joo, Yongin (KR); Kwan-Hee Lee, Yongin (KR);
Min-Soo Kim, Yongin (KR)

(73) Assignee: Samsung Display Co., Ltd.,
Giheung-Gu, Yongin, Gyeonggi-Do (KR)

( * ) Notice: Subject to any disclaimer, the term of this patent is extended or adjusted under 35 U.S.C. 154(b) by 559 days.

(21) Appl. No.: 12/939,415

(22) Filed: Nov. 4, 2010

(65) Prior Publication Data

US 2011/0174132 A1 Jul. 21, 2011

(30) Foreign Application Priority Data

Jan. 19, 2010 (KR) .......................... 10-2010-0004754

(51) Int. Cl.
*C03B 33/00* (2006.01)
*B26D 3/06* (2006.01)
(52) U.S. Cl.
USPC ............................................. 83/875; 225/93
(58) Field of Classification Search
USPC ............ 225/1–5, 879, 880, 881, 93–96.5, 98, 225/103, 104, 105; 83/879–885, 886, 663, 83/665, 698.41
See application file for complete search history.

(56) References Cited

U.S. PATENT DOCUMENTS

| 3,903,767 | A | * | 9/1975 | Kupersmith | 83/880 |
| 4,423,836 | A | * | 1/1984 | Hyatt | 225/96 |
| 5,836,229 | A | * | 11/1998 | Wakayama et al. | 83/886 |
| 2003/0159297 | A1 | | 8/2003 | Chae | |
| 2004/0217142 | A1 | | 11/2004 | Kwon et al. | |
| 2005/0211047 | A1 | | 9/2005 | Eom | |
| 2007/0056171 | A1 | * | 3/2007 | Taryoto | 30/350 |

FOREIGN PATENT DOCUMENTS

| JP | 62292634 A | * | 12/1987 | .............. C03B 11/00 |
| JP | 09085734 A | * | 3/1997 | .............. B28D 1/24 |
| JP | 09188534 | | 7/1997 | |
| JP | 09278474 | | 10/1997 | |
| JP | 2004292278 | | 10/2004 | |
| KR | 10-2009-0055433 | | 6/2009 | |
| WO | 2009/036744 | | 3/2009 | |

OTHER PUBLICATIONS

Korean Office Action issued on Nov. 22, 2011 in connection with Korean Patent Application Serial No. 10-2010-0004754 and Request for Entry of the Accompanying Office Action attached herewith.

* cited by examiner

*Primary Examiner* — Ghassem Alie
(74) *Attorney, Agent, or Firm* — Robert E. Bushnell, Esq.

(57) ABSTRACT

A cutting device that facilitates a cutting operation of a glass substrate and reduces internal defects that can be caused by surface cracks. The cutting wheel includes a cutting blade formed along a circumference thereof with respect to a rotation axis, wherein first and second slopes of the cutting blade are formed in an asymmetrical shape about an edge of the cutting blade where the first and second slopes meet each other.

9 Claims, 11 Drawing Sheets

CUTTING WHEEL FOR GLASS SUBSTRATE

CLAIM OF PRIORITY

This application makes reference to, incorporates the same herein, and claims all benefits accruing under 35 U.S.C. §119 from an application earlier filed in the Korean Intellectual Property Office on the 19 of Jan. 2010 and there duly assigned Ser. No. 10-2010-0004754.

BACKGROUND OF THE INVENTION

1. Field of the Invention

The general inventive concept relates to a cutting wheel.

2. Description of the Related Art

To manufacture display devices, such as organic light emitting display devices or liquid crystal display devices, unit substrates are formed from a substrate base material and a plurality of pixels that display an image are formed on the unit substrates. Here, unit substrates are produced by cutting a large substrate base material or by removing excess portions of unit substrates that have dimensions greater than a standardized unit substrate.

The above information disclosed in this Related Art section is only for enhancement of understanding of the background of the invention and therefore it may contain information that does not form the prior art that is already known to a person of ordinary skill in the art.

SUMMARY OF THE INVENTION

Aspects of the present invention provide for a cutting wheel that can readily perform a cutting operation of a glass substrate and can reduce internal defects caused by surface cracks.

According to an aspect of the present invention, a cutting wheel has a cutting blade formed along a circumference thereof with respect to a rotation axis, wherein first and second slopes of the cutting blade are formed in an asymmetrical shape about a cutting edge of the cutting blade.

The first and second slopes may be inclined with angles different from each other about a vertical line that crosses the cutting edge.

The cutting wheel may further include a cutting tip on an edge portion of the cutting blade. Here, the cutting tip may be asymmetrically formed about the vertical line that crosses the cutting edge. Also, when lengths of the cutting tip which extend in directions parallel to the first and second slopes are L1 and L2 respectively, the L1 and L2 may meet the inequality L1>L2.

The cutting tip may have a boundary surface parallel to the rotation axis of the cutting wheel or the cutting tip may have a boundary surface inclined with respect to the rotation axis of the cutting wheel.

The cutting wheel may further include a plurality of saw blades protruded from a circumference of the cutting blade.

According to another aspect of the present invention, a cutting wheel may have a cutting blade formed along a circumference thereof with respect to a rotation axis, wherein a cutting tip may be formed on an edge portion of the cutting wheel where first and second slopes meet each other and, when lengths of the cutting tip, which are extending in directions parallel to the first and second slopes are L1 and L2, the L1 and L2 may meet the inequality of L1>L2.

The first and second slopes may be inclined with angles different from each other with respect to a vertical line that crosses the cutting edge, or the first and second slopes may be inclined substantially at an identical angle with respect to a vertical line that crosses the cutting edge.

The cutting tip may have a boundary surface parallel to the rotation axis of the cutting wheel, or the cutting tip may have a boundary surface inclined with respect to the rotation axis of the cutting wheel.

The cutting wheel may further include a plurality of saw blades protruded from a circumference of the cutting blade, wherein the cutting tip may be formed on each of the cutting blades.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
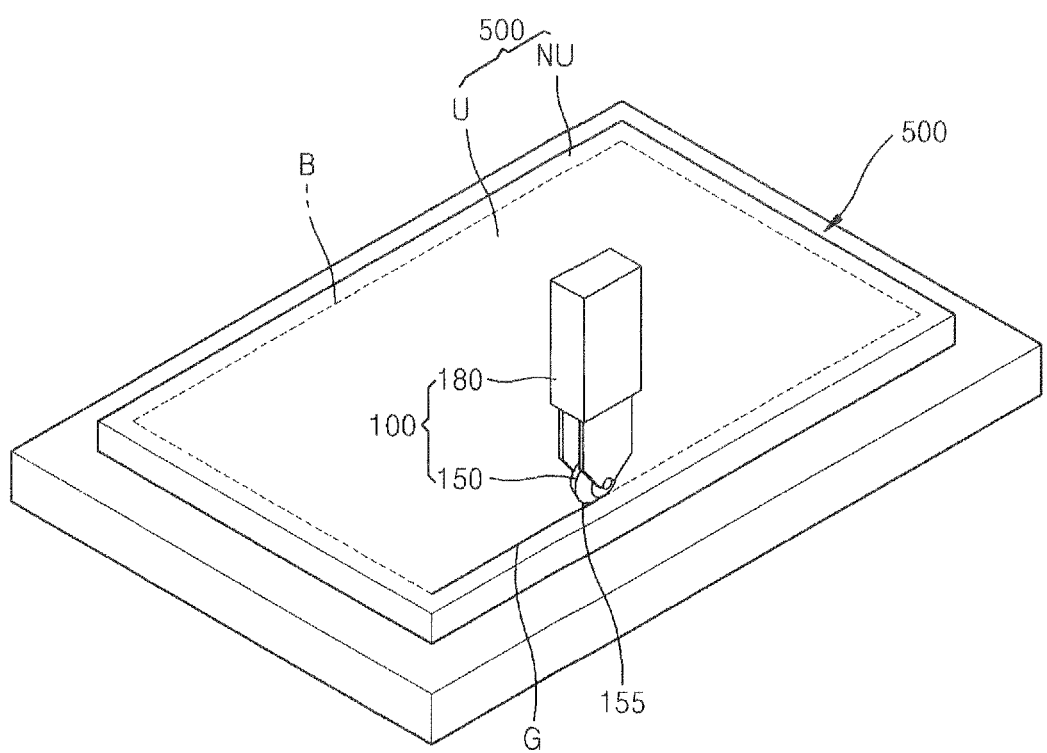
FIG. 1 is a perspective view of a wheel assembly having a cutting wheel, according to an embodiment of the present invention.

The present invention will now be described more fully with reference to the accompanying drawings in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Typically, in order to cut a substrate base material, a technique using a laser beam or a method of using a cutting wheel may be adopted. In the former case, high equipment costs are incurred and productivity is limited. However, in the latter case, in order to achieve a cutting operation, a cutting wheel is forcedly applied on a surface of a substrate base material to form a cutting groove having a predetermined depth in the surface of the substrate base material, and afterwards, both sides of the substrate base material are separated using the cutting groove as a boundary line. Using this conventional approach, a plurality of surface cracks are formed in the surface of the substrate base material to which a force is applied by the cutting wheel. The generation of surface cracks facilitates the cutting operation; however, the surface cracks result as internal defects of a display device and cause product failure according to the stress state of the surface cracks.

FIG. 1 is a perspective view of a cutting wheel assembly 100 having a cutting wheel, according to an embodiment of the present invention.

Referring to FIG. 1, the cutting wheel assembly 100 may include the cutting wheel 150 having a cutting blade 155 on a circumference thereof and a wheel holder 180 that supports the cutting wheel 150 to be able to rotate. Left and right side surfaces of the cutting wheel 150 may be supported to rotate with respect to the wheel holder 180. The cutting blade 155 may be formed on an outer part of the cutting wheel 150 to be able to apply a predetermined pressure onto a surface of a substrate base material 500.

For example, in order to form a unit substrate having a standardized dimension from the substrate base material 500 by removing a remaining portion from the standardized dimension of a unit substrate, a cutting line B may be determined to separate an unrequired portion NU that eventually will be removed from an effective portion U from which a unit substrate will be formed. Next, a cutting groove G may be formed by rotating the cutting blade 155 on the cutting line B to a predetermined depth with a predetermined pressure. Afterwards, a unit substrate having a standardized dimension may be formed from the substrate base material 500 by separating the substrate base material 500 using the cutting groove G as a boundary line.

Figure 2:
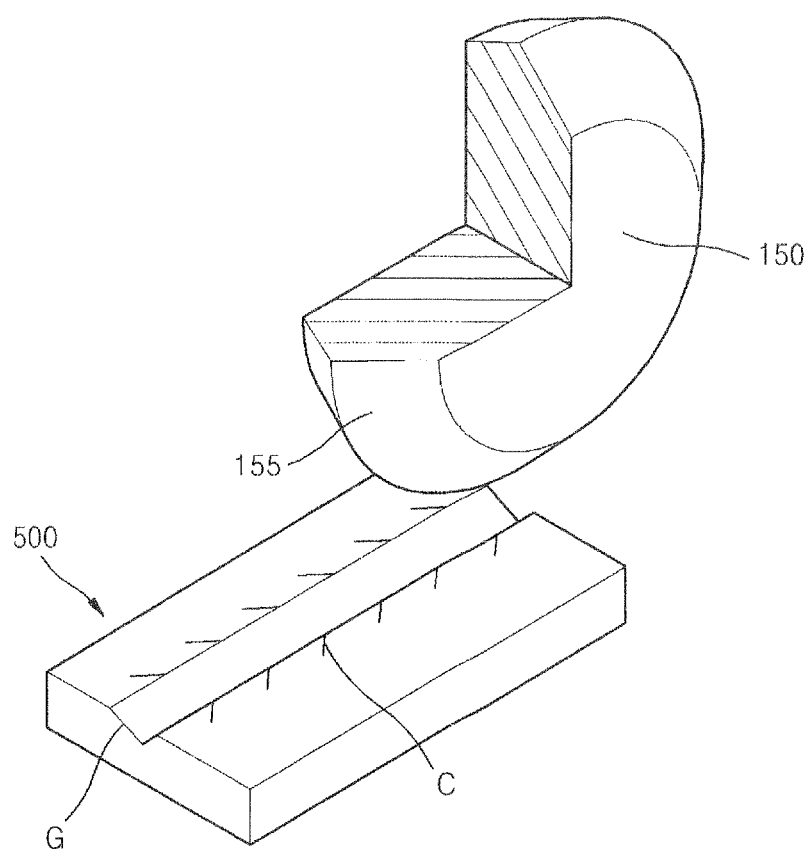
FIG. 2 is a magnified perspective view of the cutting wheel of FIG. 1.

FIG. 2 is a magnified perspective view of the cutting wheel 150 of FIG. 1.

Referring to FIG. 2, a cutting edge of the cutting blade 155 located on an outer part of the cutting wheel 150 rotates on a surface of the substrate base material 500, and according to the rotation of the cutting wheel 150, a subsequent edge portion of the cutting blade 155 contacts the surface of the substrate base material 500 with a predetermined pressure, and thus, a cutting groove G having a triangularly caved shape is formed in the substrate base material 500. As a result, a unit substrate having an adequate dimension may be formed by separating the substrate base material 500 using the cutting groove G as a boundary line. Here, surface cracks C may be formed in the surface of the substrate base material 500 along both side boundaries of the cutting groove G. For example, the surface cracks C may propagate with respect to approximately a vertical direction to the cutting groove G and the formation and propagation of the surface cracks C may be increased according to the pressure applied by the cutting wheel 150. The increase in growth of the surface cracks C may facilitate the cutting operation of the substrate base material 500; however, the surface cracks C may propagate and grow in a unit substrate formed from the substrate base material 500, and eventually, may be a cause of ultimately damaging, such as fracturing, the unit substrate.

Figure 3:
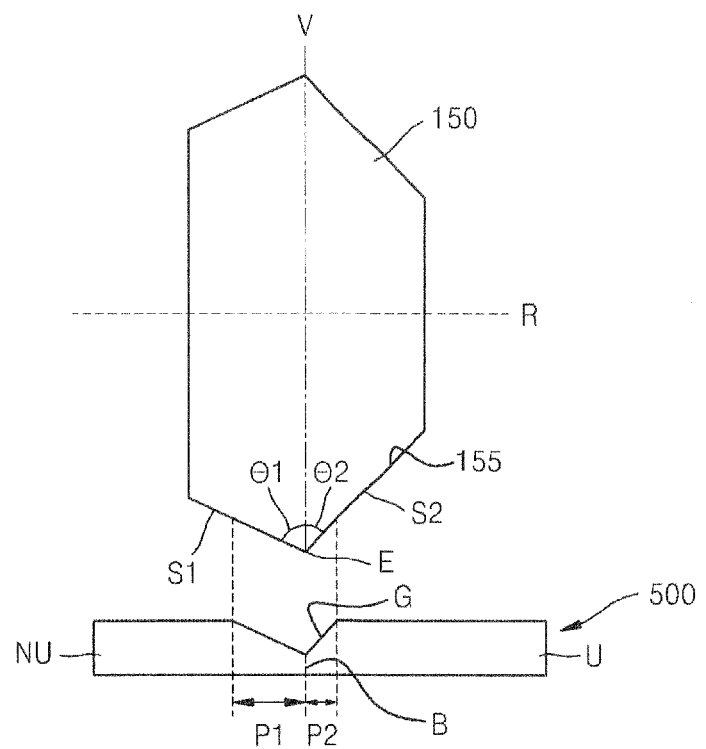
FIG. 3 is a front view of the cutting wheel of FIG. 2.

FIG. 3 is a front view of the cutting wheel 150 of FIG. 2.

Referring to FIG. 3, first and second slopes S1 and S2 (also referred to as first side and second side) that constitute the cutting blade 155 have a predetermined inclination and form the cutting edge E of the cutting blade 155 at a position where the first and second slopes S1 and S2 meet each other. The first slope S1 has a first inclination angle $\theta 1$ and the second slope S2 has a second inclination angle $\theta 2$ respectively with respect to a vertical line V that crosses the cutting edge E of the cutting blade 155. The cutting wheel 150 has an asymmetrical shape about the cutting edge E as a boundary line. That is, when the first inclination angle $\theta 1$ and the second inclination angle $\theta 2$ are designed to be different from each other and the cutting wheel 150 is pressed onto the surface of the substrate base material 500 to a predetermined depth, a portion of the substrate base material 500 that is forcedly contacted by the first slope S1 and a portion of the substrate base material 500 that is forcedly contacted by the second slope S2 have contact areas different from each other.

For example, when the first inclination angle $\theta 1$ and the second inclination angle $\theta 2$ have an inequality of $\theta 1 > \theta 2$, a first pressurized region P1 formed by the first slope S1 and a second pressurized region P2 formed by the second slope S2 may have an inequality of $P1 > P2$, and in this case, the first pressurized region P1 onto which pressure is more relatively concentrated than second pressurized region P2 may have more surface cracks C than the second pressurized region P2. That is, the cutting blade 155 is asymmetrically designed so that pressure applied on the surface of the substrate base material 500 is biased towards a side with respect to the cutting line B, and thus, to artificially form an asymmetrical distribution of surface cracks C. The portion of the substrate base material 500 on which the surface cracks C are concentrated is discarded, and the other portion of the substrate base material 500 on which surface cracks C are less concentrated is used as a product of unit substrate.

While the generation of surface cracks C is promoted and the cutting operation of the substrate base material 500 is readily performed using the generated surface cracks C, a unit substrate may be formed by taking a portion of the substrate base material 500 having relatively less surface cracks C by biasing the surface cracks C to a side of the substrate base material 500 with respect to the cutting line B as a boundary line. For example, when a unit substrate having a standardized dimension is formed by removing a remaining portion from the standardized dimension of a unit substrate, a cutting line B may be determined to separate an unrequired portion NU of the substrate base material 500 that will eventually be removed and an effective portion U of which a unit substrate is formed. Next, a cutting groove G is formed by forcedly rotating the cutting blade 155 on the cutting line B to a predetermined depth. Here, the first slope S1 of the cutting blade 155 arranged to forcedly contact the unrequired portion NU and the second slope S2 of the cutting blade 155 is arranged to forcedly contact the effective portion U so that surface cracks C can be biased towards the unrequired portion NU. Since the unrequired portion NU of the substrate base material 500 may be a portion to be discarded after the unrequired portion NU is separated, the frequency and the propagation of the surface cracks C is not important. However, since the effective portion U may be a portion to be a unit substrate to constitute a final product, in consideration of durability, it is advantageous that the effective portion U has relatively less internal defects such as cracks. For example, when a weight is repeatedly applied to the unit substrate according to an operation environment of a display device, the surface cracks C formed in a surface of the unit substrate may grow and propagate and may eventually cause a final damage.

Figure 4:
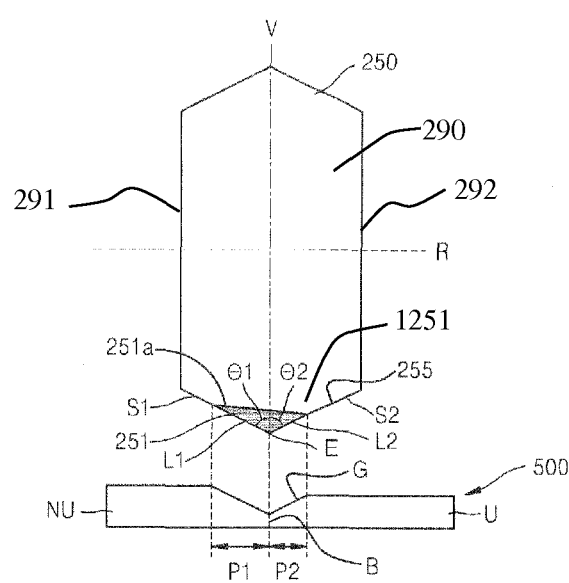
FIGS. 4 through 6 are front views of cutting wheels according to other embodiments of the present invention.

FIG. 4 is a front view of a cutting wheel 250 according to another embodiment of the present invention.

Referring to FIG. 4, the cutting wheel 250 may include a cutting blade 255 and a center body 290. First and second slopes S1 and S2 that constitute the cutting blade 255 have a predetermined inclination and form a sharp cutting edge E at a position where the first and second slopes S1 and S2 meet each other. As shown in FIG. 4, the first slope S1 of the cutting blade 255 is intersected by a third side 291 of the center body 290, and the second slope S2 of the cutting blade 255 is intersected by a fourth side 292, opposite to the third side 291, of the center body 290. The first slope S1 may have a first inclination angle θ1 with respect to a vertical line V that crosses the cutting edge E of the cutting blade 255, and the second slope S2 has a second inclination angle θ2 with respect to the vertical line V. The first inclination angle θ1 and the second inclination angle θ2 substantially are identical angles, that is, θ1=θ2.

A cutting tip 251 having a wedge shape may be formed on the cutting edge E of the cutting blade 255. The cutting tip 251 may be, for example, a diamond tip or a cemented carbide tip. The cutting tip 251 may be asymmetrically formed about the vertical line V as a boundary line that crosses the cutting edge E. That is, a length L1 of the cutting tip 251 that forms the first slope S1 and a length L2 of the cutting tip 251 that forms the second slope S2 are designed to be different from each other, for example, may have an inequality of L1>L2. Here, although the first and second slopes S1 and S2 have substantially identical angles (θ1=θ2) with respect to the vertical line V, the cutting tip 251 may have an asymmetrical structure since a boundary surface 251a of the cutting tip 251 is inclined with respect to a rotation axis R. The boundary surface 251a of the cutting tip 251 may be an interface surface with another portion 1251 of the cutting blade 255.

When the cutting tip 251 that forms the cutting groove G having a predetermined depth by being forcedly applied on the surface of the substrate base material 500 is substantially asymmetrically designed, both sides of the cutting line B of the substrate base material 500 may have crack densities different from each other. For example, with respect to the cutting line B as a boundary line, the frequency of the surface cracks C or the growth (propagation) of the surface cracks C may be biased to a side of the substrate base material 500. As shown in FIG. 4, when the cutting tip 251 is designed to be biased towards the first slope S1, the surface cracks C may be promoted on the portion of the substrate base material 500 into which the cutting tip 251 is pressed by the first slope S1, and the frequency or the growth (propagation) of the surface cracks C may be relatively reduced on the portion of the substrate base material 500 into which the cutting tip 251 is pressed by the second slope S2.

For example, when a standardized unit substrate is formed from the substrate base material 500 by removing a remaining portion from the standardized dimension of a unit substrate, a cutting line B may be determined on the surface of the substrate base material 500 to define an unrequired portion NU to be removed and an effective portion U of which a unit substrate is formed. Afterwards, a cutting groove G having a triangularly caved shape with a predetermined depth may be formed in the cutting line B by pressing the cutting blade 255 to a predetermined depth and rotating the cutting blade 255. Here, the first slope S1 of the cutting tip 251 may be arranged to strongly contact the unrequired portion NU while the second slope S2 of the cutting tip 251 may be arranged to strongly contact the effective portion U so that the surface cracks C can be biased towards the unrequired portion NU. Since the unrequired portion NU is a portion to be removed after the substrate base material 500 is separated, the frequency or the growth (propagation) of the surface cracks C is not important. However, since the effective portion U is a portion to be a unit substrate to constitute a final product, in consideration of durability, it is advantageous that the effective portion U has relatively less internal defects such as cracks.

Figure 5:
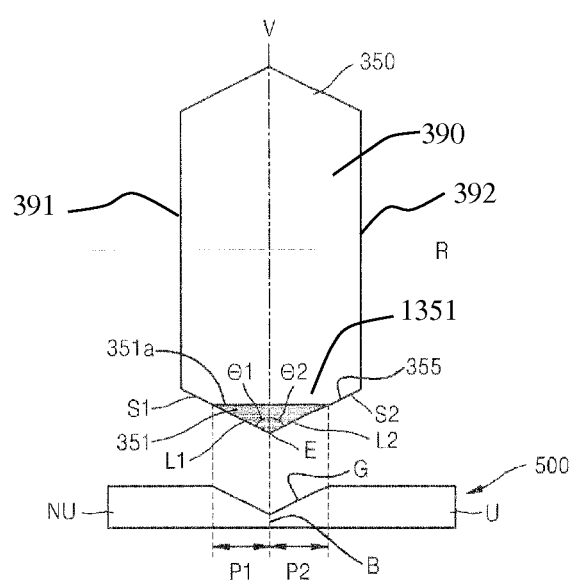

FIG. 5 is a front view of a cutting wheel 350 according to another embodiment of the present invention.

Referring to FIG. 5, the cutting wheel 350 may include a cutting blade 355 and a center body 390. First and second slopes S1 and S2 that constitute the cutting blade 355 have a predetermined inclination and form a sharp cutting edge E at a position where the first and second slopes S1 and S2 meet each other. As shown in FIG. 5, the first slope S1 of the cutting blade 355 is intersected by a third side 391 of the center body 390, and the second slope S2 of the cutting blade 355 is intersected by a fourth side 392, opposite to the third side 391, of the center body 390. A cutting tip 351 having a wedge shape may be formed on the cutting edge E portion of the cutting blade 355. The cutting tip 351 may be, for example, a diamond tip or a cemented carbide tip. The cutting tip 351 forms a cutting groove G having a constant depth in a surface of the substrate base material 500 by being pressed to a predetermined depth.

An overall shape of the cutting blade 355 including the cutting tip 351 may be asymmetrical about the cutting edge E as a boundary line. A first slope S1 of the cutting blade 355 may have a first inclination angle θ1 with respect to a vertical line V that crosses the cutting edge E, and a second slope S2 may have a second inclination angle θ2 with respect to the vertical line V. The first and second inclination angles θ1 and θ2 may be designed to be different from each other, that is, θ1>θ2, and thus, a length L1 of the cutting tip 351 that constitutes the first slope S1 and a length L2 of the cutting tip 351 that constitutes the second slope S2 may be different from each other. For example, a boundary surface 351a of the cutting tip 351 which may be an interface with another portion 1351 of the cutting blade 355, may be formed parallel to a rotation axis R; however, the first slope S1 and the second slope S2 may be formed to have angles different from each other. Accordingly, the cutting tip 351 may have an asymmetrical structure.

Since the first slope S1 and the second slope S2 may be formed to have angles different from each other, when the cutting blade 355 is pressed onto the surface of the substrate base material 500 to a predetermined depth, a portion of the substrate base material 500 that is forcedly contacted by the first slope S1 and a portion of the substrate base material 500 that is forcedly contacted by the second slope S2 have areas different from each other. In particular, when the pressing regions of the wedge-shaped cutting tip 351 that press onto the surface of the 500 are compared, a region P1 where the first slope S1 is pressed and a region P2 where the second slope S2 is pressed may have an inequality of P1>P2. More surface cracks C may be formed in the region P1 pressed by the first slope S1 where pressure is relatively concentrated. That is, the density and growth of surface cracks C may be artificially asymmetrically formed by designing the cutting blade 355 including the cutting tip 351 so that pressure is biased towards a side of the substrate base material 500 from the cutting line B as a boundary line. Here, a portion of the substrate base material 500 on which more surface cracks C are formed may be used as a portion to be removed, and the other portion may be used as a unit substrate.

While the generation of surface cracks C is promoted and the cutting operation of the substrate base material 500 is readily performed using the generated surface cracks C, a unit substrate may be formed by taking a portion of the substrate base material 500 having relatively less surface cracks C by biasing the surface cracks C to a side of the substrate base material 500 with respect to the cutting line B as a boundary line. For example, when a unit substrate having a standardized dimension is formed by removing a remaining portion from the standardized dimension of a unit substrate, a cutting line B may be determined to define an unrequired portion NU of the substrate base material 500 that will eventually be removed and an effective portion U of the substrate base material 500 of which a unit substrate is formed. Next, a cutting groove G may be formed by forcedly rotating the cutting blade 155 on the cutting line B to a predetermined depth. Here, the first slope S1 of the cutting blade 355 may be arranged to strongly contact the unrequired portion NU and the second slope S2 may be arranged to strongly contact the effective portion U. In this way, the surface cracks C may be biased to the unrequired portion NU. Since the unrequired portion NU is a portion to be removed after the substrate base material 500 is separated, the frequency and propagation of the surface cracks C are not important. However, since the effective portion U is a portion to be a unit substrate to constitute a final product, in consideration of durability, it is advantageous that the effective portion U has relatively less internal defects such as cracks.

Figure 6:
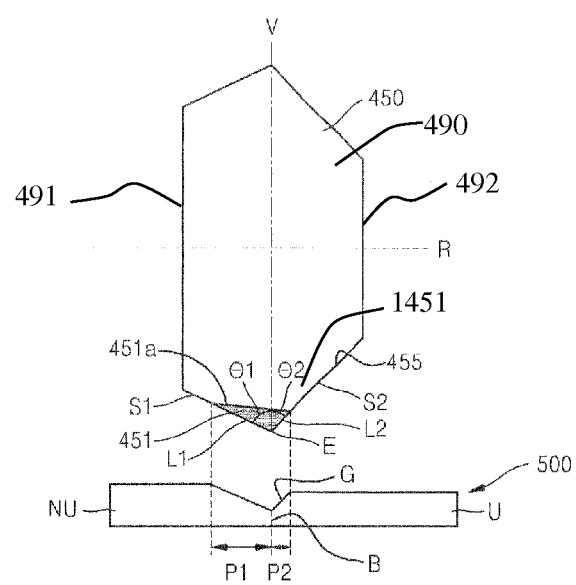

FIG. 6 is a front view of a cutting wheel 450 according to another embodiment of the present invention. The cutting wheel 450 may include a cutting blade 455 and a center body 490. Referring to FIG. 6, a cutting edge E may be formed at a circumference of the cutting wheel 450 where first and second slopes S1 and S2 that constitute the cutting blade 455 meet each other, and a cutting tip 451 may be formed on an edge portion of the cutting wheel 450. As shown in FIG. 6, the first slope S1 of the cutting blade 455 is intersected by a third side 491 of the center body 490, and the second slope S2 of the cutting blade 455 is intersected by a fourth side 492, opposite to the third side 491, of the center body 490. The cutting tip 451 may be asymmetrically formed about a vertical line V that crosses the cutting edge E of the cutting tip 451. Accordingly, lengths L1 and L2 of the cutting tip 451, which are respectively extending in directions parallel to the first and second slopes S1 and S2, may be designed different from each other, that is, L1>L2.

Here, in order to realize an asymmetrical structure of the cutting tip 451, first and second inclination angles θ1 and θ2 that are respectively formed between the first and second slopes S1 and S2 and the vertical line V may be designed to be different from each other, that is, θ1>θ2. Also, a boundary surface 451a of the cutting tip 451, which may be an interface with another portion 1451 of the cutting blade 455, may be inclined at a predetermined angle with respect to a rotation axis R. The cutting tip 451 of FIG. 6 may be considered as a composite shape of the cutting tip 251 of FIG. 4, in which the boundary surface 451a of the cutting tip 451 may be inclined with respect to the rotation axis R, and the cutting tip 351 of FIG. 5, in which the first and second slopes S1 and S2 may have angles different from each other.

Figure 7:
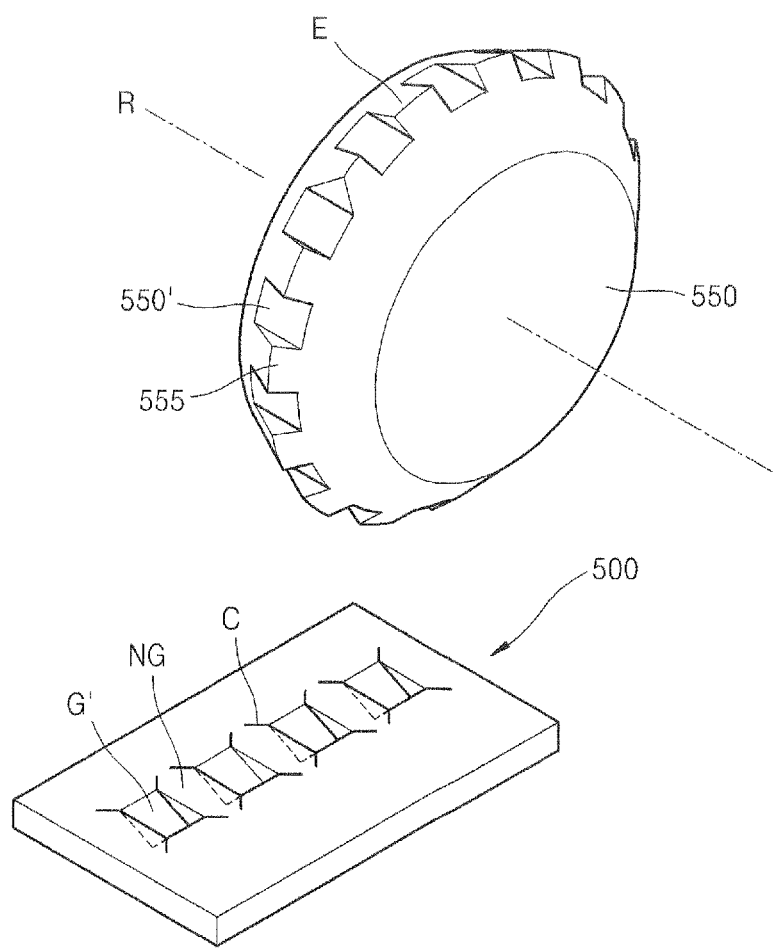
FIG. 7 is a perspective view of a cutting wheel according to another embodiment of the present invention.

FIG. 7 is a perspective view of a cutting wheel 550 according to another embodiment of the present invention.

Referring to FIG. 7, saw blades 555 positioned on a lower surface of the cutting wheel 550 that rotates along the substrate base material 500 may be cutting edges E. As cutting wheel 550 rotates, a subsequent saw blade 555 contacts the substrate base material 500 with a predetermined pressure, and thus, forms a groove G' in the substrate base material 500. More specifically, the saw blades 555 may be formed along a circumference of the cutting wheel 550 with constant intervals, and may be pressed onto a surface of the substrate base material 500. Each of the saw blades 555 that enters into the substrate base material 500 forms a groove G' along the cutting line of the substrate base material 500. As the cutting wheel 550 rotates, a subsequent saw blade 555 forms a subsequent groove G' in the substrate base material 500. Also, non-grooved regions NG having a relatively small deformation may be formed on the substrate base material 500 between the grooves G' by contacting the substrate base material 500 with non-cutting blade portions 550' of the cutting wheel 550.

A unit substrate having an appropriate dimension may be formed from the substrate base material 500 by separating the substrate base material 500 using a boundary line as a cutting line including a plurality of grooves G'. Surface cracks C are formed around the groove G' in the surface of the substrate base material 500. For example, the surface cracks C may be formed in a radial shape propagating from the boundary of the groove G', and the growth and propagation of the surface cracks C may be increased according to the pressure applied by the saw blades 555. The promotion for generating the surface cracks C may facilitate the cutting operation of the substrate base material 500; however, the surface cracks C may propagate and grow in a unit substrate formed from the substrate base material 500, and eventually, may be a cause of a ultimately damaging, such as fracturing, the unit substrate.

Figure 8:
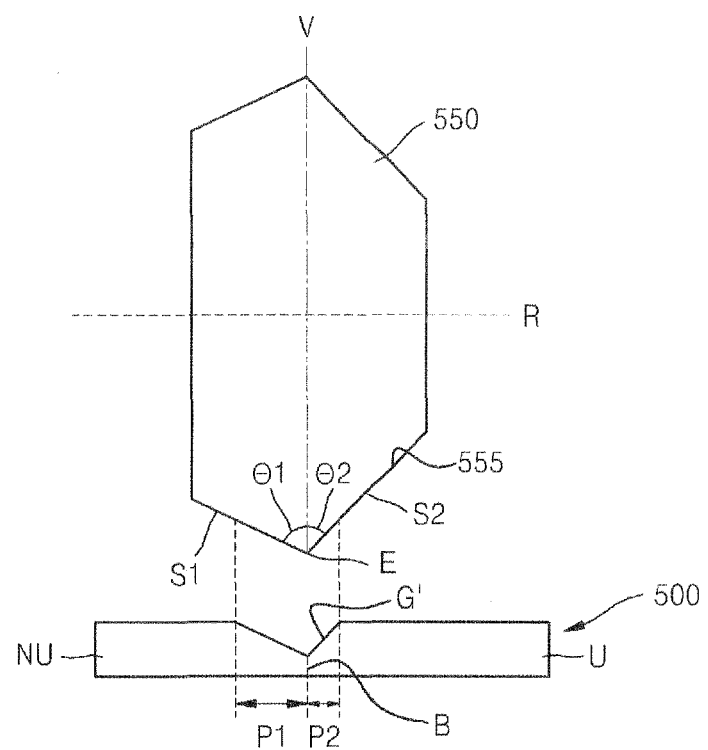
FIGS. 8 through 11 are front views of cutting wheels according to other embodiments of the present invention.

FIG. 8 is a front view of the cutting wheel 550 of FIG. 7, according to another embodiment of the present invention.

Referring to FIG. 8, first and second slopes S1 and S2 that constitute a saw blade 555 may have a predetermined inclination and form a sharp cutting edge E of the saw blade 555 at a position where the first and second slopes S1 and S2 meet each other. The first slope S1 may have a first inclination angle θ1 with respect to the vertical line V that crosses the cutting edge E of the saw blade 555, and the second slope S2 may have a second inclination angle θ2 with respect to the vertical line V. The saw blade 555 may have an asymmetrical shape about the cutting edge E as a boundary line. That is, the first and second inclination angles θ1 and θ2 of the saw blade 555 are designed to be different from each other, and when the saw blade 555 is pressed onto the surface of the substrate base material 500 to a predetermined depth, a portion of the substrate base material 500 that contacts the first slope S1 and a portion of the substrate base material 500 that contacts the second slope S2 may have areas different from each other. For example, when the first and second inclination angles θ1 and θ2 of the saw blade 555 have an inequality of θ1>θ2, a region P1 pressed by the first slope S1 and a region P2 pressed by the second slope S2 may have an inequality of P1>P2. More surface cracks C may be formed in the region P1 pressed by the first slope S1 where pressure is relatively concentrated. While the generation of surface cracks C may be promoted and the cutting operation of the substrate base material 500 may be readily performed using the generated surface cracks C, a unit substrate may be formed by taking a portion of the substrate base material 500 having relatively less surface cracks C by biasing the surface cracks C to a side of the substrate base material 500 with respect to the cutting line B as a boundary line. For example, when a remaining portion of the substrate base material 500 is removed to form a unit substrate having a standardized dimension, the first slope S1 of the saw blade 555 may be arranged to contact an unrequired portion NU which may be a portion of the substrate base material 500 to be removed, and the second slope S2 may be arranged to contact an effective portion U of which a unit substrate will be formed, and afterwards, a cutting operation is performed. In this case, the surface cracks C may be biased towards the unrequired portion NU, and accordingly, the generation of surface cracks C in the effective portion U may be reduced, thereby obtaining a display device having high durability.

Figure 9:
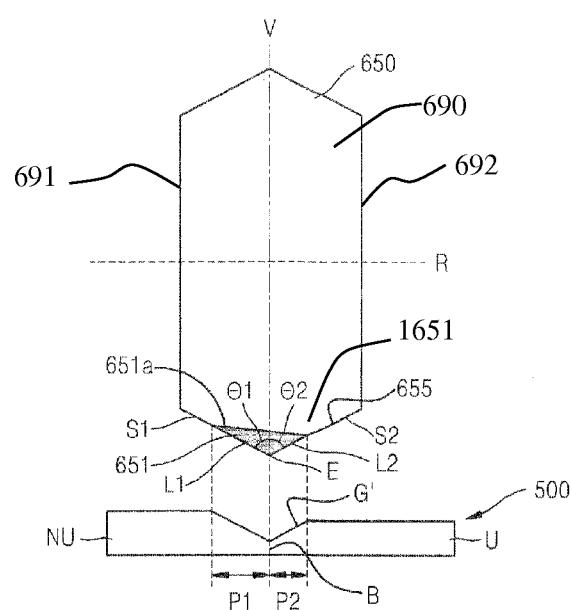

FIG. 9 is a front view of a cutting wheel 650 according to another embodiment of the present invention.

Referring to FIG. 9, the cutting wheel 650 may include a cutting blade 655 and a center body 690. First and second slopes S1 and S2 that constitute the cutting blade 655 may have a predetermined inclination and form a sharp cutting edge E of the cutting blade 655 at a position where the first and second slopes S1 and S2 meet each other. As shown in FIG. 9, the first slope S1 of the cutting blade 655 is intersected by a third side 691 of the center body 690, and the second slope S2 of the cutting blade 655 is intersected by a fourth side 692, opposite to the third side 691, of the center body 690. The first slope S1 may have a first inclination angle θ1 with respect to the vertical line V that crosses the cutting edge E of the cutting blade 655, and the second slope S2 may have a second inclination angle θ2 with respect to the vertical line V. The first and second inclination angles θ1 and θ2 of the saw blade 555 may be designed to be identical angles.

A cutting tip 651 having a wedge shape may be formed on the cutting edge E portion of the cutting blade 655. The cutting tip 651 may be, for example, a diamond tip or a cemented carbide tip. The cutting tip 651 may be asymmetrically formed about a vertical line V as a boundary line that crosses the cutting edge E of the cutting blade 655. That is, a length L1 of the cutting tip 651 that forms the first slope S1 and a length L2 of the cutting tip 651 that forms the second slope S2 may be designed to be different from each other, for example, may meet an inequality of L1>L2. Here, although first and second slopes S1 and S2 have substantially identical angles (θ1=θ2) with respect to the vertical line V, the cutting tip 651 may have an asymmetrical structure since a boundary surface 651a of the cutting tip 651 may be inclined with respect to a rotation axis R. The boundary surface 651a of the cutting tip 651 may be an interface surface with another portion 1651 of the cutting blade 655.

The cutting tip 651 that forms a cutting groove G having a constant depth by being strongly contacted onto a surface of the substrate base material 500 to a predetermined depth may be asymmetrically designed so that the frequency and propagation of surface cracks C can be biased to a side of a cutting line as a boundary line. As shown in FIG. 9, when the cutting tip 651 may be designed to be biased towards the first slope S1, the generation of surface cracks C may be promoted on a side of the substrate base material 500 onto which the first slope S1 is pressed, and the frequency or growth (propagation) of the surface cracks C may be reduced on the other side of the substrate base material 500 onto which the second slope S is pressed.

Figure 10:
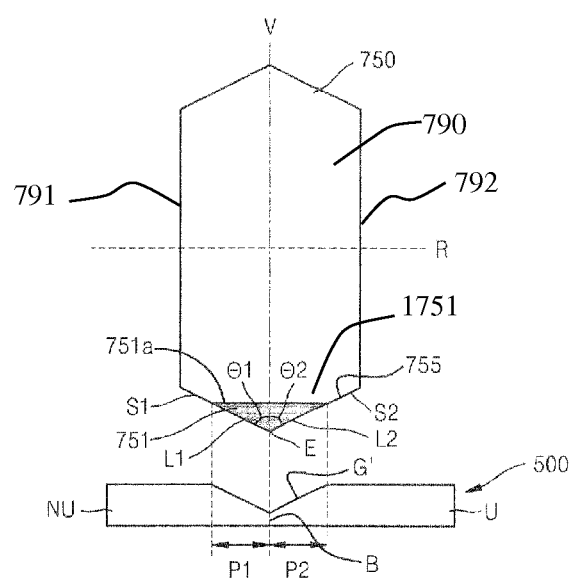

FIG. 10 is a front view of a cutting wheel 750 according to another embodiment of the present invention.

Referring to FIG. 10, the cutting wheel 750 may include a cutting blade 755 and a center body 790. First and second slopes S1 and S2 that constitute the cutting blade 755 may have a predetermined inclination and form a sharp cutting edge E of the cutting blade 755 at a position where the first and second slopes S1 and S2 meet each other. As shown in FIG. 10, the first slope S1 of the cutting blade 755 is intersected by a third side 791 of the center body 790, and the second slope S2 of the cutting blade 755 is intersected by a fourth side 792, opposite to the third side 791, of the center body 790. A cutting tip 751 having a wedge shape may be formed on the cutting edge E portion of the cutting blade 755. The cutting tip 751 may be, for example, a diamond tip or a cemented carbide tip. The cutting tip 751 forms a cutting groove G having a constant depth in a surface of the substrate base material 500 by being pressed to a predetermined depth.

An overall shape of the cutting blade 755 including the cutting tip 751 may be asymmetrical about the cutting edge E as a boundary line. A first slope S1 of the cutting blade 755 may have a first inclination angle θ1 with respect to a vertical line V that crosses the cutting edge E, and a second slope S2 may have a second inclination angle θ2 with respect to the vertical line V. The first and second inclination angles θ1 and θ2 may be designed to be different from each other, that is, θ1>θ2, and thus, a length L1 of the cutting tip 751 that constitutes the first slope S1 and a length L2 of the cutting tip 751 that constitutes the second slope S2 may be different from each other. For example, a boundary surface 751a of the cutting tip 751, which may be an interface with another portion 1751 of the cutting blade 755, may be formed parallel to a rotation axis R; however, the first slope S1 and the second slope S2 may be formed to have angles different from each other, that is, θ1>θ2. Accordingly, the cutting tip 751 may have an asymmetrical structure.

If the first and second slopes S1 and S2 of the cutting blade 755 are designed to have angles different from each other, when the cutting blade 755 is pressed onto a surface of the substrate base material 500 to a predetermined depth, a portion of the substrate base material 500 that is forcedly contacted by the first slope S1 and a portion of the substrate base material 500 that is forcedly contacted by the second slope S2 may have areas different from each other. In particular, when the pressed regions of the wedge-shaped cutting tip 751 that is pressed into the substrate base material 500 are compared, a region P1 where the first slope S1 is pressed and a region P2 where the second slope S2 is pressed may have an inequality of P1>P2. More surface cracks C may be formed in the region P1 pressed by the first slope S1 where pressure is relatively concentrated. When a unit substrate having a standardized dimension is formed by removing a remaining portion from the standardized dimension of a unit substrate, the cutting blade 755 may be arranged so that the first slope S1 contacts an unrequired portion NU of the substrate base material 500 that will eventually be removed and the second slope S2 contacts an effective portion U of which a unit substrate is formed, and afterwards, a cutting operation may be performed. In this case, the surface cracks C may be biased towards the unrequired portion NU, and accordingly, the generation of surface cracks C in the effective portion U may be reduced, thereby obtaining a display device having high durability.

Figure 11:
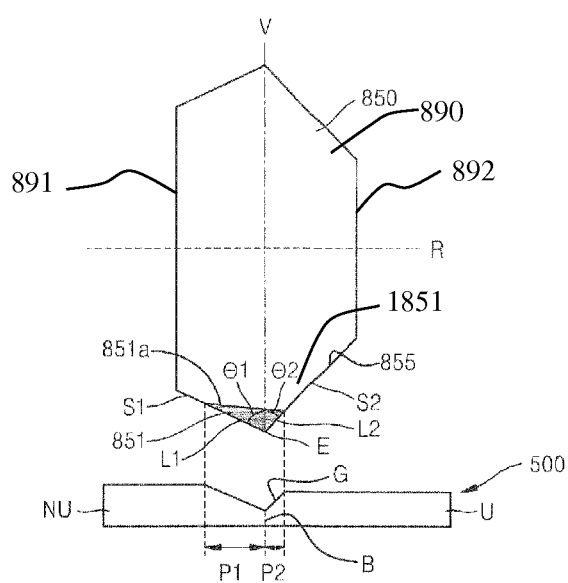

FIG. 11 is a front view of a cutting wheel 850 according to another embodiment of the present invention.

Referring to FIG. 11, the cutting wheel 850 may include a cutting blade 855 and a center body 890. A sharp cutting edge E of a cutting blade 855 may be formed on a position where first and second slopes S1 and S2 meet each other and a cutting tip 851 may be formed on the cutting edge E portion of the cutting blade 855. As shown in FIG. 11, the first slope S1 of the cutting blade 855 is intersected by a third side 891 of the center body 890, and the second slope S2 of the cutting blade 855 is intersected by a fourth side 892, opposite to the third side 891, of the center body 890. The cutting tip 851 may be formed asymmetrically about a vertical line V that crosses the cutting edge E of the cutting tip 851. Accordingly, lengths L1 and L2 of the cutting tip 851, which are respectively extending in directions parallel to the first and second slopes S1 and S2, may be different from each other, that is, L1>L2.

Here, in order to realize an asymmetrical structure of the cutting tip 851, first and second inclination angles θ1 and θ2, which are respectively formed between the first and second slopes S1 and S2 and the vertical line V, may be designed to be different from each other, that is, θ1>θ2. Also, a boundary surface 851a of the cutting tip 851, which may be an interface with another portion 1851 of the cutting blade 855, may be inclined at a predetermined angle with respect to a rotation axis R. The cutting tip 851 of FIG. 11 may be considered as a composite shape of the cutting tip 651 of FIG. 9, in which the boundary surface 851a of the cutting tip 851 may be inclined with respect to the rotation axis R, and the cutting tip 751 of FIG. 10, in which the first and second slopes S1 and S2 may have angles different from each other.

According to the present invention, the generation and propagation (growth) of surface cracks in a substrate base material can be controlled to be concentrated on a side of the substrate base material with respect to a cutting line by asymmetrically forming a cutting blade that performs a cutting operation by being pressed onto a surface of the substrate base material. Also, a region of the substrate base material where the surface cracks are concentrated is defined as a unrequired portion and a region where the surface cracks are relatively less concentrated is defined as an effective portion of which a unit substrate is formed. In this way, the surface cracks inevitably generated in a cutting process can be prevented from being an internal defect of a display device.

While the present invention has been particularly shown and described with reference to exemplary embodiments thereof, it will be understood by one of ordinary skill in the art that various changes in form and detail may be made therein without departing from the spirit and scope of the present invention as defined by the following claims.

What is claimed is:

1. A cutting wheel, comprising:
    a center body having third and fourth sides substantially parallel and opposite to each other;
    a cutting blade formed along a circumference of the center body of the cutting wheel with respect to a rotational axis of the cutting wheel, said cutting blade having first and second sides which are intersected by the third and fourth sides, respectively and which are formed in an asymmetrical shape about a vertical line crossing a cutting edge where the first and second sides meet each other, the cutting blade comprising:
    a cutting tip formed asymmetrically about the vertical line on a peripheral edge of the cutting blade and including the cutting edge; and
    a portion positioned between the center body of the cutting wheel and the cutting tip of the cutting blade, an interface positioned between the cutting tip and the portion of the cutting blade crossing the cutting blade, intersecting the first and second sides, and not crossing any of the third and fourth sides of the center body.

2. The cutting wheel of claim 1, wherein lengths of the cutting tip, which extend in directions parallel to the first and second sides, are L1 and L2, the lengths, L1 and L2, meet the inequality L1>L2.

3. The cutting wheel of claim 1, the interface of the cutting tip and the portion of the cutting blade is parallel to the rotational axis of the cutting wheel.

4. The cutting wheel of claim 1, wherein the cutting tip has the interface of the cutting tip and the portion of the cutting blade inclined with respect to the rotational axis of the cutting wheel.

5. The cutting wheel of claim 1, further comprising a plurality of saw blades that protrude from a circumference of the cutting blade.

6. The cutting wheel of claim 1, wherein the cutting tip is a diamond tip or a cemented carbide tip.

7. The cutting wheel of claim 1, wherein a cutting groove conforming to the shape of the cutting edge is formed in a substrate with the application of pressure by the cutting wheel onto the substrate.

8. The cutting wheel of claim 7, comprised of the first side having the first side of the cutting blade being configured to apply greater force to the substrate when the cutting device is forming the cutting groove than force applied by the second side having the second side of the cutting blade onto the cutting groove.

9. The cutting wheel of claim 8, wherein more surface cracks are created in the substrate on a side of the cutting grove corresponding to the first side having the first side of the cutting blade than surfaces cracks created on another side of the cutting groove corresponding to the second side having the second side of the cutting blade.

* * * * *